US012703515B2

(12) United States Patent
Prampolini et al.

(10) Patent No.: US 12,703,515 B2
(45) Date of Patent: Aug. 11, 2026

(54) REUSABLE ORBITAL VEHICLE COMPRISING A CREW-EVACUATION VEHICLE FOR FORWARD EXTRACTION

(71) Applicant: ARIANEGROUP SAS, Les Mureaux (FR)

(72) Inventors: Marco Prampolini, Les Mureaux (FR); Alexis Bourgoing, Les Mureaux (FR); Federico Giovanni Maretto, Les Mureaux (FR)

(73) Assignee: ARIANEGROUP SAS, Les Mureaux (FR)

( * ) Notice: Subject to any disclaimer, the term of this patent is extended or adjusted under 35 U.S.C. 154(b) by 0 days.

(21) Appl. No.: 18/993,473

(22) PCT Filed: Jul. 12, 2023

(86) PCT No.: PCT/FR2023/051086
§ 371 (c)(1),
(2) Date: Jan. 10, 2025

(87) PCT Pub. No.: WO2024/013460
PCT Pub. Date: Jan. 18, 2024

(65) Prior Publication Data

US 2026/0008567 A1 Jan. 8, 2026

(30) Foreign Application Priority Data

Jul. 13, 2022 (FR) ...................................... 2207234

(51) Int. Cl.
*B64G 1/52* (2006.01)
*B64G 1/12* (2006.01)
*B64G 1/64* (2006.01)

(52) U.S. Cl.
CPC ............... *B64G 1/525* (2023.08); *B64G 1/12* (2013.01); *B64G 1/645* (2013.01)

(58) Field of Classification Search
CPC . B64G 1/52; B64G 1/525; B64G 1/00; B64G 1/12; B64G 1/645; B64G 1/66
See application file for complete search history.

(56) References Cited

U.S. PATENT DOCUMENTS 2,977,080 A 3/1961 Von Zborowski
3,260,204 A * 7/1966 Wilkey, Jr. ............. F42B 15/36 102/378

(Continued)

FOREIGN PATENT DOCUMENTS

CN 114739238 A * 7/2022 ............. F42B 15/00
CN 114750977 A * 7/2022 ............. F42B 10/48

(Continued)

OTHER PUBLICATIONS

Nov. 8, 2023 International Search Report issued in International Patent Application No. PCT/FR2023/051086.

(Continued)

*Primary Examiner* — Benjamin P Lee
(74) *Attorney, Agent, or Firm* — Williams Mullen; R. Brian Drozd

(57) ABSTRACT

A reusable orbital vehicle for a space transport system including a fuselage with a shape splayed in a direction going from a front end of the reusable orbital vehicle as far as a rear end of said fuselage and within which a housing is defined, and a crew-evacuation vehicle housed in said housing while being oriented so as to be extracted from the housing in a direction oriented from said rear end of the fuselage towards said front end of the reusable orbital vehicle.

9 Claims, 6 Drawing Sheets

(56) References Cited

U.S. PATENT DOCUMENTS 3,576,298 A * 4/1971 Barnett .................... B64G 1/14 244/159.3
5,143,327 A * 9/1992 Martin ................... B64G 1/401 244/171.3
5,568,901 A * 10/1996 Stiennon .................. B64G 1/14 244/171.3
5,927,653 A * 7/1999 Mueller ................. B64G 1/623 244/164
6,494,406 B1 * 12/2002 Fukushima ............ B64G 1/645 244/173.3
6,827,313 B1 * 12/2004 Aldrin .................... B64G 1/643 244/171.1
6,948,682 B1 9/2005 Stephenson et al.
8,002,219 B2 * 8/2011 Camarda .................. B64G 1/40 244/171.3
9,273,634 B2 * 3/2016 Bahn ......................... F02K 9/96
10,054,411 B2 * 8/2018 Quertelet ................ F42B 10/46
10,214,303 B1 * 2/2019 Turner ..................... B64G 1/14
10,377,510 B1 * 8/2019 Riskas ..................... B64G 1/64
11,565,628 B2 * 1/2023 Johnson ................. B64G 1/002
11,565,835 B1 * 1/2023 Weinberg ............. B64G 1/6455
2005/0103220 A1 * 5/2005 Cleveland ............... F42B 15/36 102/378
2005/0193916 A1 * 9/2005 Cleveland ............... F42B 15/38 102/378
2007/0012821 A1 * 1/2007 Buehler ................... B64G 1/52 244/171.9
2008/0265099 A1 * 10/2008 Camarda .................. B64G 1/40 244/171.1
2013/0043352 A1 * 2/2013 Bahn ......................... F02K 9/96 244/171.1
2014/0263841 A1 * 9/2014 Featherstone ............ B64G 1/14 244/171.1
2017/0167838 A1 * 6/2017 Quertelet ................ F42B 15/34
2020/0307461 A1 * 10/2020 Johnson ................. B64G 1/641
2022/0041306 A1 * 2/2022 Koda ..................... B64G 1/645
2025/0121959 A1 * 4/2025 Nieminen ................ B64G 1/26

FOREIGN PATENT DOCUMENTS

EP 1013546 A2 * 6/2000 ............. B64G 1/002
FR 3116512 A1 5/2022
JP 05085500 A * 4/1993 ............. B64G 1/641
RU 2053168 C1 1/1996
WO 2014/021741 A2 2/2014

OTHER PUBLICATIONS

Nov. 8, 2023 Written Opinion issued in International Patent Application No. PCT/FR2023/051086.

* cited by examiner

D1
C
R
14
24
27, 42
28
32, 34
40
48
46
22
30
26

14
32
76
R1
R2
70
28
38
56
P
36
27, 42
39
24
40
52
34
44
100
50
51
22
60
59
90
C
R
D1, D2

76
70
102
32
P
27
54
52
100
50
51
22
C
R

FIG. 4
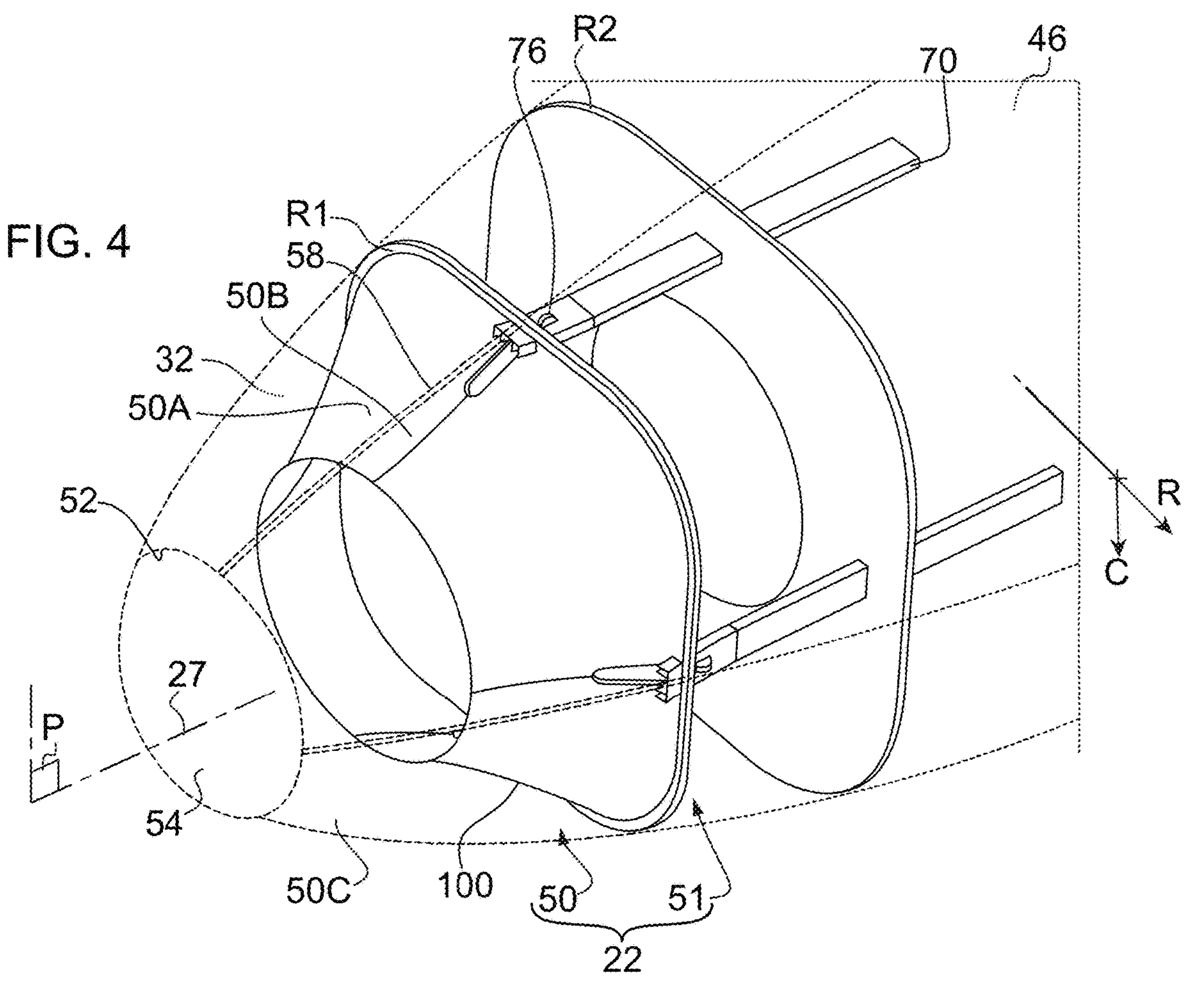
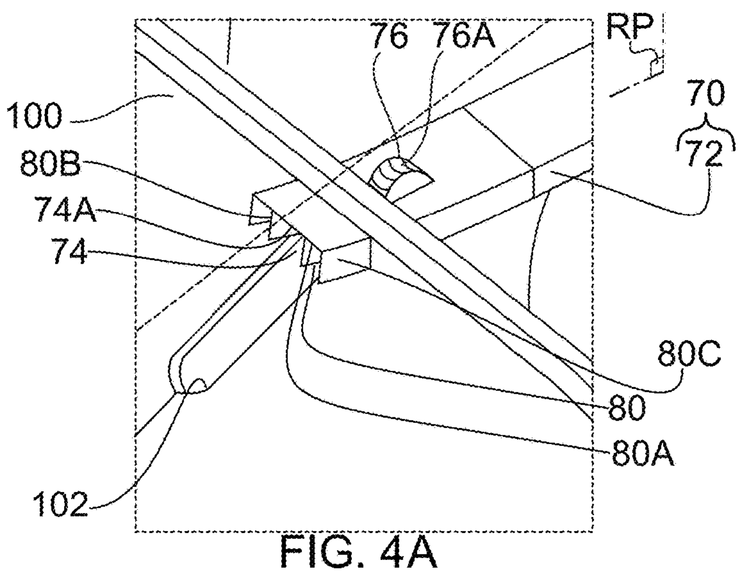
FIG. 4A 34
60
68
64
78
69
90
61
40
61
R
C
78
44
56
38
36
60 90
59
42
D2

34
62
60
90
68
78
61
44
56
61
38
78
42
64
40
D2
C
59
R

FIG. 8
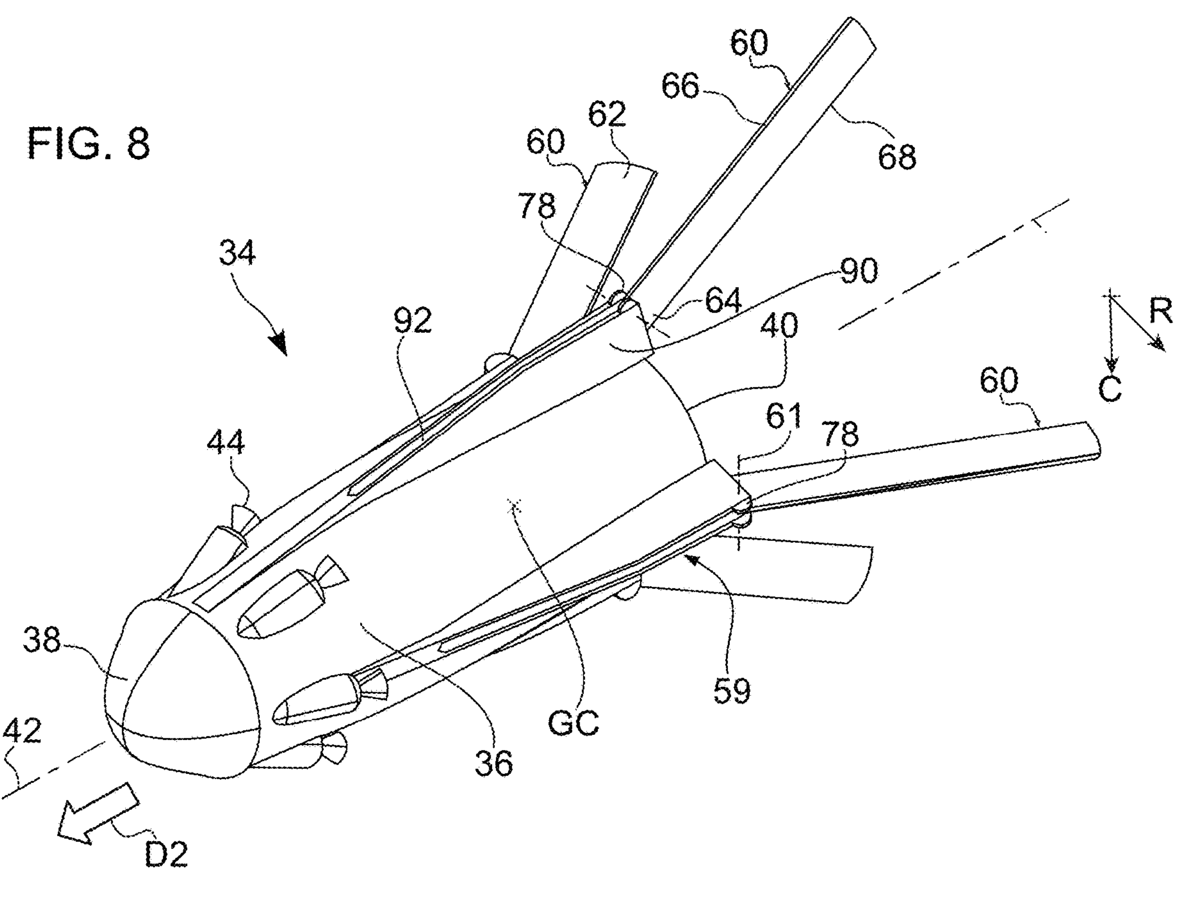
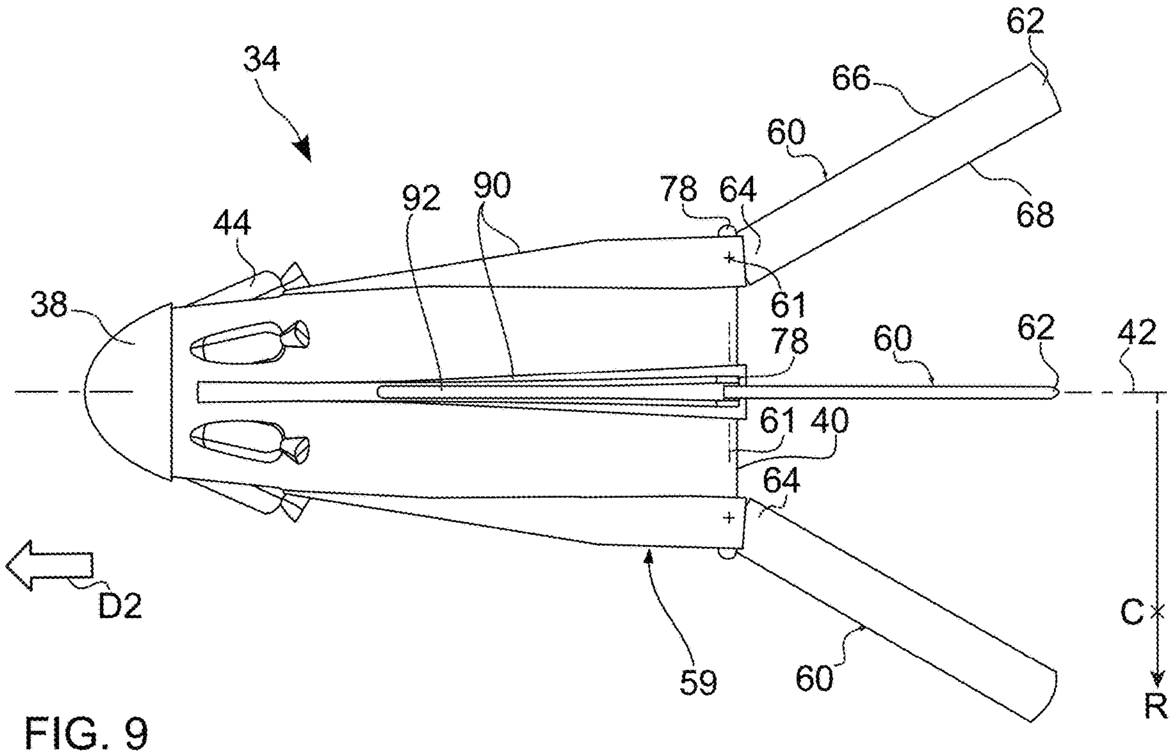
FIG. 9

REUSABLE ORBITAL VEHICLE COMPRISING A CREW-EVACUATION VEHICLE FOR FORWARD EXTRACTION

TECHNICAL FIELD

The present invention relates in general terms to the field of space transport for persons.

The invention relates in particular to a reusable orbital vehicle and a method for evacuating the crew of such a vehicle, enabling a crew to be evacuated in the event of mission interruption.

PRIOR ART

Manned space missions are generally performed by means of a space transport system comprising a reusable orbital vehicle that accommodates a crew, installed on a space launcher. “Reusable vehicle” means any space vehicle designed to make an atmosphere re-entry and to land at the end of its mission, without this excluding possibly having to replace certain components of the vehicle before being able to perform a new space mission therewith.

In some cases, the orbital vehicle is installed at the top of the launcher and thus forms the last stage thereof, the first stages being propulsion stages intended to separate successively from the launcher during or at the end of the ascent phase after having consumed their fuel.

One important aspect of this type of space transport system relates to the possibilities of evacuating the crew in the case of a problem during the space mission.

In the currently operational systems, the reusable orbital vehicle is used to evacuate the crew in the event of failure of the launcher during takeoff or the ascent phase. For this purpose, thrusters equipping the reusable orbital vehicle are fired to detach the reusable orbital vehicle from the space launcher as quickly as possible.

The speed of this manoeuvre is however limited because of the potentially great mass of an orbital vehicle, the latter having to contain all the equipment necessary for accomplishing the missions in orbit.

In addition, in the event of failure of the reusable orbital vehicle itself at a subsequent stage of the space mission, the prior art offers as a solution for evacuating the crew only rescue capsules the use of which is possible only in the approach phase when the orbital vehicle has been sufficiently slowed. In addition, the use of such capsules may present a danger when the orbital vehicle is not suitably oriented.

DISCLOSURE OF THE INVENTION

The object of the invention is a reusable orbital vehicle making it possible to at least partly remedy these problems, and a method for evacuating the crew of such a vehicle.

It proposes for this purpose a reusable orbital vehicle for a space transport system, comprising a fuselage with a shape splayed in a direction going from a front end of the reusable orbital vehicle as far as a rear end of said fuselage and within which a housing is defined extending as far as a front end of the fuselage, and a crew-evacuation vehicle housed in said housing while being oriented so as to be extracted from the housing in a direction oriented from said rear end of the fuselage towards said front end of the reusable orbital vehicle.

In general terms, the fact that the crew-evacuation vehicle is extracted from the reusable orbital vehicle towards the front, in the nominal movement direction of the reusable orbital vehicle, makes this extraction possible not only in the ascent phase but also on the launch pad before takeoff and during the approach and landing phases, and even subsequently to landing, since the chances of the reusable orbital vehicle having an attitude compatible with such extraction are thus maximised.

In preferred embodiments of the invention, said fuselage comprises a fairing that surrounds the housing and extends splayed in the direction of the rear end of this fuselage from the front end of the fuselage, which is truncated so as to define an opening that emerges in the housing; and the crew-evacuation vehicle comprises a fuselage that has a nose extending through the opening so as to constitute a nose of the reusable orbital vehicle.

Preferably, said nose extends in aerodynamic continuity with the fairing.

Preferably, the fuselage has a step formed at the base of said nose, and wherein the truncated front end of the fairing is arranged axially facing said step.

Preferably, the fairing is formed by an annular row of panels joined in pairs by frangible connections constituting preferred rupture zones.

In preferred embodiments of the invention, the reusable orbital vehicle comprises a baffle skirt with a roughly frustoconical shape, extending within the housing so as to surround the crew-evacuation vehicle and to be disposed at the rear and axially facing with respect to propulsion means of the crew-evacuation vehicle configured to generate a thrust in said direction.

The invention also relates to a method for evacuating a crew of a reusable orbital vehicle of the type described above, comprising steps consisting in:

A) installing the crew of the reusable orbital vehicle in the crew-evacuation vehicle; then B) evacuating the crew by moving the crew-evacuation vehicle in said direction so as to extract it out of the housing.

In preferred embodiments of the invention, the crew-evacuation vehicle takes with it the nose of the reusable orbital vehicle during the step B.

In preferred embodiments of the invention, the crew-evacuation vehicle causes the rupture of said frangible connections during the step B.

In preferred embodiments of the invention, the crew-evacuation vehicle causes the rupture of said baffle skirt during the step B.

In preferred embodiments of the invention, the step B is performed during any one of the takeoff, ascent, end of atmosphere re-entry, final approach, landing and post-landing phases.

BRIEF DESCRIPTION OF THE DRAWINGS

The invention will be understood better, and other details, advantages and features thereof will appear from the reading of the following description made by way of non-limitative example and with reference to the accompanying drawings, wherein:

FIG. 2 is a schematic view in perspective of a front part of the reusable orbital vehicle, giving a view, through the fuselage of the reusable orbital vehicle, of a crew-evacuation vehicle housed therein;

FIG. 4 is a view similar to FIG. 2 without the crew-evacuation vehicle;

FIG. 4A is a view to a larger scale of a part of FIG. 4;

FIG. 8 is a schematic view in perspective of the crew-evacuation vehicle in a second configuration intended for flight;

FIG. 9 is a schematic view in longitudinal section of the crew-evacuation vehicle in the second configuration.

DETAILED DISCLOSURE OF PREFERRED EMBODIMENTS

Figures 1A, 1B:
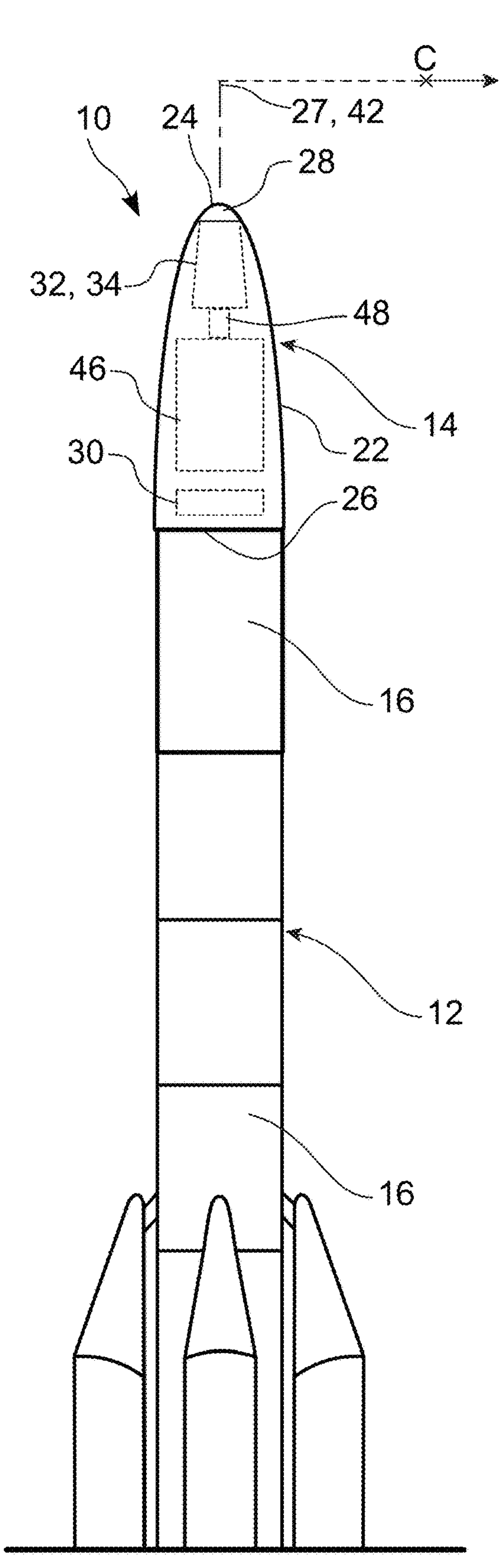
FIG. 1A is a schematic view of a space transport system comprising a reusable orbital vehicle.
FIG. 1B is a schematic view of the reusable orbital vehicle at the end of a space mission.

FIG. 1A illustrates a space transport system 10 comprising in general terms a space launcher 12 at the top of which a reusable orbital vehicle 14 is installed.

The space launcher 12 typically comprises one or more propulsion stages 16.

The reusable orbital vehicle 14 comprises an aerodynamic fuselage 22 with an overall shape splayed in a direction going from a front end 24 of the reusable orbital vehicle towards a rear end 26 of this fuselage. The opposite direction, which is therefore oriented from the rear end 26 towards the front end 24, constitutes a nominal movement direction D1 of the vehicle, which is for example parallel to a mean longitudinal axis 27 of the vehicle. In the present description, this axis 27 servers as a reference for defining a cylindrical reference frame {R, C} wherein the radial direction R is at every point a direction orthogonal to the axis 27 and passing through the latter, and the orthoradial direction Cis at every point a direction orthogonal to the axis 27 and to the radial direction R.

It must therefore be understood that the reusable orbital vehicle 14 is designed to move in the direction D1 in all the phases of a space mission, including in the atmosphere re-entry phase, and to not have to turn over except during the final approach phase with a view to landing on the rear of the vehicle. In order to confer an optimum profile on the reusable orbital vehicle 14, the latter is provided with a nose 28, preferentially in the form of a cap or more generally in the form of a truncated cone with a rounded vertex, forming the front end 24 of the vehicle, as will appear more clearly hereinafter.

The reusable orbital vehicle 14 furthermore comprises propulsion means 30 comprising for example one or more rocket engines. These propulsion means 30 are able in particular to generate a thrust oriented in the nominal movement direction D1. It should be noted that, when the reusable orbital vehicle 14 is installed on the space launcher 12 as illustrated on FIG. 1A, the nose 28 of the reusable orbital vehicle constitutes a front end of the whole of the space transport system 10, while the rear end 26 of the fuselage 22 is located facing a propulsion stage 16 of the launcher.

During a typical mission, the complete space transport system 10 is launched from a launch pad, being propelled by the propulsion stage or stages 16. The latter successively cease to operate and separate from the space transport system 10 until the reusable orbital vehicle 14 is left to continue its trajectory and to reach a target orbit, using as required its propulsion means 30 for making trajectory adjustments. At the end of the mission, the reusable orbital vehicle 14 uses its propulsion means 30 in order to leave its orbit and to place itself on an atmosphere re-entry trajectory enabling it to reach a target landing zone. For this purpose, means for orienting the reusable orbital vehicle 14, which may for example be the propulsion means 30 or movable aerodynamic surfaces, are used so as to orient the reusable orbital vehicle so as to place the fuselage 22 of this vehicle at an angle of incidence enabling said fuselage 22 to generate lift. Throughout this phase, the reusable orbital vehicle has its nose 28 towards the front in the direction of its movement, so that the nose 28 contributes to the thermal protection of the reusable orbital vehicle. At the approach to the target landing zone, the reusable orbital vehicle 14 makes a turning-over manoeuvre and then positions itself by orienting its nose 28 upwards and the rear end 26 of the fuselage 22 towards the ground.

The present disclosure aims, in general terms, to present means for improving the arrangements for rescuing a crew in the event of a problem during a space mission.

Figure 6:
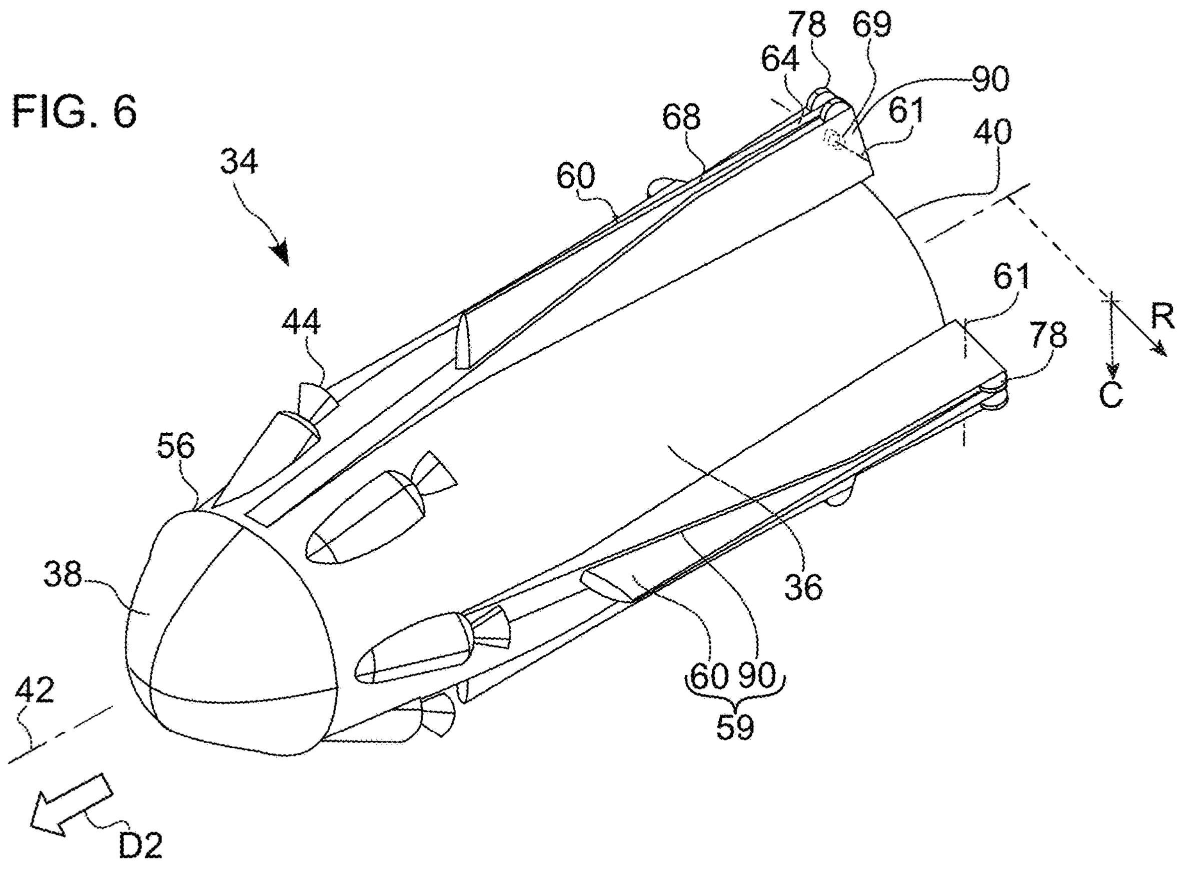
FIG. 6 is a schematic view in perspective of the crew-evacuation vehicle in a first configuration intended for incorporating the crew-evacuation vehicle in the reusable orbital vehicle.
Figure 7:
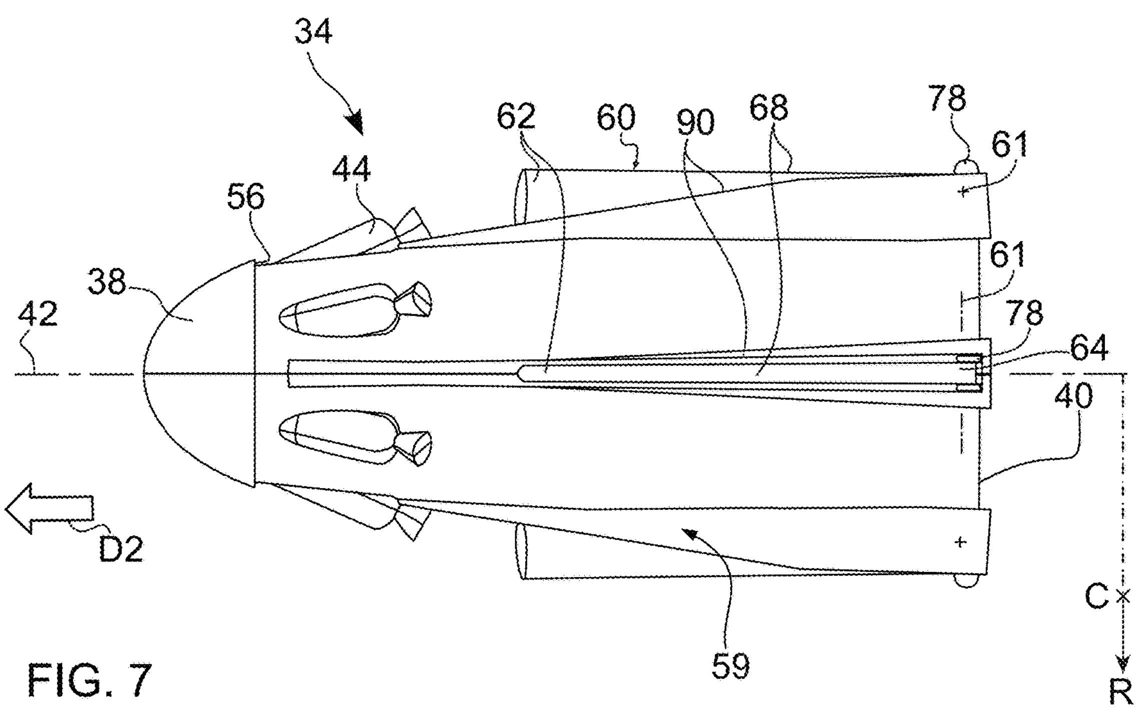
FIG. 7 is a schematic view in longitudinal section of the crew-evacuation vehicle in the first configuration.

For this purpose, with reference to FIGS. 2-5, the reusable orbital vehicle 14 comprises a housing 32 surrounded by the fuselage 22 and in which a crew-evacuation vehicle 34 is disposed, also visible alone on FIGS. 6 and 7, so that said crew-evacuation vehicle 34 can be extracted from the reusable orbital vehicle 14 and fly independently of the latter. The crew-evacuation vehicle 34 is intended to make it possible to evacuate a crew out of the reusable orbital vehicle 14 during the ascent phase but also on the launch pad, before takeoff and at the moment of takeoff, as well as in final approach and landing phase and subsequently to landing, as will appear more clearly hereinafter.

At takeoff or on the launch pad, it is in particular advantageous to use such a dedicated vehicle for crew evacuation instead of using the reusable orbital vehicle itself, since a vehicle dedicated to evacuation can have a significantly reduced mass compared with the mass of a reusable orbital vehicle, which must incorporate all the equipment intended for accomplishing the various missions of the crew in orbit as well as the equipment and components necessary for allowing atmosphere re-entry. The gain in terms of extraction acceleration allowed by such a reduction in mass can in particular prove crucial for saving a crew in the event of explosion of the space launcher 12 on takeoff or in ascent phase. This gain can also make it possible to extend the ballistic trajectory of the crew-evacuation vehicle, which is advantageous in the case where the zone surrounding the launch pad does not offer the required safety conditions for recovering the crew-evacuation vehicle. In certain embodiments, the crew-evacuation vehicle is thus capable of moving away from the launch pad by a few kilometres, for example 3.5 km in one example implementation or 5 km in another example implementation, in the case of triggering of the evacuation procedure on the launch pad.

In final approach and landing phases and subsequently to landing, the presence of a vehicle dedicated to evacuation makes it possible to envisage an evacuation of the crew in the case of a problem on the reusable orbital vehicle, which is obviously not possible in the case where such a dedicated vehicle is not provided and where any possibility of evacuation during the space mission must take place by means of the reusable orbital vehicle itself.

By comparison with the extraction towers well known from the prior art (for example those of Apollo, Soyuz or Orion), which are disposed entirely in front of an orbital vehicle, housing the crew-evacuation vehicle within the orbital vehicle makes it possible to keep the crew-evacuation vehicle available throughout the mission, whereas the extraction towers, which are not adapted to make atmosphere re-entry manoeuvres, are generally jettisoned during the ascent phase.

The crew-evacuation vehicle 34 advantageously comprises within it a cabin provided with control equipment (not visible on the figures), and means for interfacing this equipment with components and/or equipment of the reusable orbital vehicle 14 (other than those forming part of the crew-evacuation vehicle 34), in particular with the propulsion means 30 and where applicable with the means for orienting the reusable orbital vehicle (if these differ from the propulsion means 30), so that the reusable orbital vehicle 14 is controlled by a crew in the crew-evacuation vehicle 34 by means of said control equipment.

In addition, the crew-evacuation vehicle 34 comprises a roughly bullet-shaped fuselage 36 defining a nose 38 at one end of the crew-evacuation vehicle, referred to as the front end 39 thereof having regard to a nominal movement direction D2 of the crew-evacuation vehicle. This fuselage 36 extends in the opposite direction as far as a rear wall 40 that defines a rear end of the fuselage 36. The rear wall 40 extends for example transversely to an axis 42 of the crew-evacuation vehicle, which constitutes for example a symmetry axis for the fuselage 36. Between the nose 38 and the rear wall 40, the fuselage 36 has, at least in a front portion thereof, a shape slightly splayed in the direction going from the nose 38 towards the rear wall 40, in order to best satisfy the area rule, as will become clearer hereinafter. The fuselage 36 thus defines an aerodynamic profile with an elongate shape along the axis 42 of the crew-evacuation vehicle, which therefore defines a longitudinal direction of this vehicle. Such a shape is optimised for favouring acceleration of the crew-evacuation vehicle in the atmosphere, in particular in the case of mission interruption on the launch pad or in the launch phase, when the speed of extraction of the crew-evacuation vehicle and distancing thereof from the launcher are the most critical. The nominal movement direction D2 of the crew-evacuation vehicle is parallel to the axis 42, as will appear more clearly hereinafter.

Finally, the crew-evacuation vehicle 34 comprises propulsion means 44 attached to the fuselage 36 thereof, to enable this crew-evacuation vehicle 34 to be extracted out of its housing 32 in the reusable orbital vehicle 14, and to allow optional adjustment of the trajectory of the crew-evacuation vehicle, as will appear more clearly hereinafter.

Moreover, the reusable orbital vehicle 14 advantageously comprises a working space 46 (FIG. 1B) defined at the rear with respect to the housing 32 and intended to be accessible to the crew during non-critical phases of orbital flight, for example by means of an airlock 48 in which a hatch arranged in the rear wall 40 of the fuselage 36 of the crew-evacuation vehicle opens out.

The landing mode of the crew-evacuation vehicle 34 is not the object of the present disclosure and can be of a conventional type, for example by means of one or more parachutes for braking the crew-evacuation vehicle until the latter touches down on land or at sea, flat or with the nose first.

According to a first aspect of the present disclosure, the housing 32 of the reusable orbital vehicle 14 extends as far as a front end of the fuselage 22 of the reusable orbital vehicle, and the crew-evacuation vehicle 34 is arranged in the housing 32 of the reusable orbital vehicle 14 while being oriented so as to allow extraction of the crew-evacuation vehicle 34 in the nominal movement direction D1 of the reusable orbital vehicle. In particular, the crew-evacuation vehicle 34 is disposed so that the nominal movement direction D2 thereof is coincident with the nominal movement direction D1 of the reusable orbital vehicle 14.

For this purpose, the crew-evacuation vehicle 34 is in particular disposed so that its axis 42 extends parallel or substantially parallel to the nominal movement direction D1 of the reusable orbital vehicle 14, while preferably being centred on a longitudinal midplane P of the reusable orbital vehicle. In the embodiment illustrated, the axis 42 of the crew-evacuation vehicle is in particular coincident with the median longitudinal axis 27 of the reusable orbital vehicle. In addition, the crew-evacuation vehicle 34 is oriented so that its nose 38 is located on the same side as the front and 24 of the reusable orbital vehicle and so that its rear wall 40 is located on the opposite side, i.e. in the same side as the rear end 26 of the fuselage 22. Furthermore, the propulsion means 44 of the crew-evacuation vehicle 34 are advantageously configured to generate a thrust oriented in the nominal movement direction D2 of the crew-evacuation vehicle 34, and therefore in the direction of the front end 24 of the reusable orbital vehicle.

In the preferential example illustrated, the nose 38 of the crew-evacuation vehicle 34 constitutes the nose 28 of the reusable orbital vehicle 14.

For this purpose, the fuselage 22 of the reusable orbital vehicle 14 comprises a fairing 50 that surrounds the housing 32 of the reusable orbital vehicle and extends so as to be splayed in the direction of the rear end 26 of this fuselage from a truncated front end 52 (FIGS. 4 and 5) of the fuselage 22 defining an opening 54 that emerges in the housing 32. In addition, the nose 38 of the crew-evacuation vehicle 34 extends through the opening 54 in aerodynamic continuity with the fairing 50. Thus the crew-evacuation vehicle 34 occupies a space or housing extending as far as the front end 24 of the reusable orbital vehicle 14, this space corresponding strictly speaking to the housing 32 and to the space occupied by the nose 38.

Figures 3, 5:
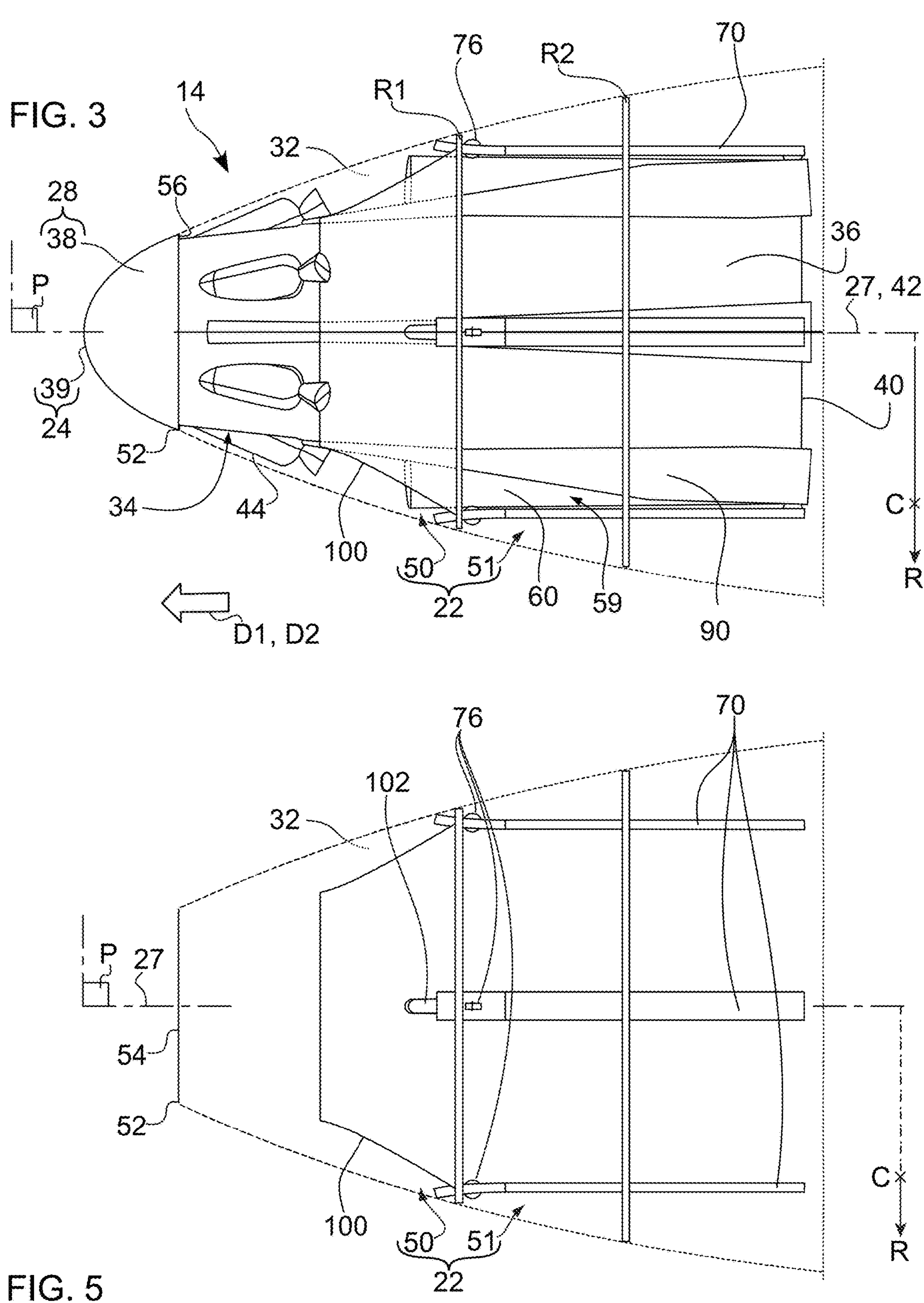
FIG. 3 is a schematic side view of the front part of the reusable orbital vehicle of FIG. 2, also giving a view of the crew-evacuation vehicle through the fuselage of the reusable orbital vehicle.
FIG. 5 is a view similar to FIG. 3 without the crew-evacuation vehicle.

Such continuity between the nose 38 of the crew-evacuation vehicle and the fairing 50 of the fuselage 22 of the reusable orbital vehicle is for example obtained by means of a step 56 formed at the base of the nose 38 in the fuselage 36 of the crew-evacuation vehicle, and facing which the truncated front end 52 of the fairing 50 is disposed (FIGS. 3, 6 and 7).

Because the shape of the crew-evacuation vehicle 34 is splayed overall towards the rear thereof, the extraction thereof out of the housing 32 means that a rear part of the crew-evacuation vehicle, wider than the opening 54, comes into collision with the fairing 50 and breaks the latter. In order best to facilitate this process and thus to optimise the speed of extraction of the crew-evacuation vehicle, the fairing 50 is designed so as to favour fragmentation thereof under the effect of the collision with the crew-evacuation vehicle 34. For this purpose, the fairing 50 consists for example of an annular row of panels joined in pairs by frangible connections 58 constituting preferred rupture zones. Three of these panels 50A-50C are visible on FIGS. 2 and 4. The fairing 50 extends for example towards the rear as far as a front fuselage frame R1 that extends transversely to the axis 42. Beyond the fairing 50 in the direction of the rear, the fuselage 22 is for example formed by a cowl or an assembly of cowls 51 that may be of a conventional type. FIGS. 2-4 furthermore reveal a rear fuselage frame R2 that also extends transversely to the axis 42. The fuselage frames R1 and R2 are intended to stiffen the fuselage, in a manner known per se. The frames R1 and R2 are advantageously disposed axially on either side of the location of a centre of gravity of the crew-evacuation vehicle 34 when the latter is installed in the housing 32. The frames R1 and R2 thus help to limit the out-of-balance effects.

In general terms, the fact that the crew-evacuation vehicle 34 is extracted from the reusable orbital vehicle 14 towards the front, in the nominal movement direction D1 of the reusable orbital vehicle or, where applicable, of the whole of the space transport system 10, makes this extraction possible not only in the ascent phase but also on the launch pad before takeoff and during the approach and landing phases, and even subsequently to landing, since the chances of the reusable orbital vehicle 14 having an attitude compatible with such extraction are thus maximised (attitude means here the orientation of the vehicle according to the terrestrial reference frame). A forward extraction on the launch pad or in the ascent phase is particularly advantageous since this generally amounts to the crew departing in the direction opposite to the danger, which is located at the propulsion stages 16 of the launcher, and therefore below the reusable orbital vehicle 14. This is all the more remarkable since evacuation on the launch pad or in ascent phase is the case of evacuation requiring the greatest reaction speed having regard to the generally explosive nature of the danger at this stage.

To make the evacuation manoeuvre bearable by the crew in terms of apparent load factor, while enabling them also to bear the thrust inherent in takeoff, the crew-evacuation vehicle comprises for example seats with modifiable orientation to enable the members of the crew to be oriented so as to feel the thrust in their backs in any critical phase, nominal or not, having high load factors, in particular during a possible evacuation by means of the crew-evacuation vehicle 34.

In addition, the fact that the nose 38 of the crew-evacuation vehicle 34 also serves as a nose 28 for the reusable orbital vehicle has the additional advantage of avoiding having to break the nose of the reusable orbital vehicle 14 when the crew-evacuation vehicle 34 is extracted out of the reusable orbital vehicle. It must in fact be understood that, when the crew-evacuation vehicle 34 is extracted out of the reusable orbital vehicle 14, the crew-evacuation vehicle takes with it the nose 38 that until then served as the nose 28 of the reusable orbital vehicle. This is particularly advantageous since the nose 28 of the reusable orbital vehicle 14 constitutes the front end part of this vehicle and is therefore particularly subject to thermal heating but also to mechanical stresses in the atmosphere re-entry phase. The nose 28 of the reusable orbital vehicle 14 must therefore be a particularly thermally resistant and mechanically strong element and is for example more so than the rest of the fuselage 36. Not having to break such an element when the crew-evacuation vehicle 34 is extracted, an operation where it is desirable that it be done as quickly as possible, is therefore a considerable advantage.

In a variant, the reusable orbital vehicle 14 may nevertheless comprise a nose 28 distinct from the nose 38 of the crew-evacuation vehicle 34 without departing from the scope of the present disclosure. It must be understood in this case that the fuselage 22 is closed at the front end thereof so as to define the nose 28 of the reusable orbital vehicle 14 in front of the nose 38 of the crew-evacuation vehicle 34. In this case, as in the previous case, the housing 32 extends as far as the front end of the fuselage 22, which is here defined by the nose 28 formed by the fuselage 22. It should be noted that, like the space occupied by the crew-evacuation vehicle 34 in the previous case, the housing 32 can here be considered to extend as far as the front end 24 of the reusable orbital vehicle 14, apart from the thickness of the nose 28.

According to a second aspect of the present disclosure, the crew-evacuation vehicle 34 comprises stabilisation devices 59, and more particularly stabilising fins 60, which are each movable between a retracted position along the fuselage 36 (FIGS. 6 and 7) to enable the crew-evacuation vehicle 34 to be housed in the housing 32 provided for this purpose in the reusable orbital vehicle 14, and a deployed position towards the rear of the crew-evacuation vehicle (FIGS. 8 and 9), wherein the stabilising fins 60 are arranged at the rear of the position of a centre of gravity GC of the crew-evacuation vehicle (FIG. 8) and generate a "shuttlecock" effect, also referred to as "skirt effect".

The "shuttlecock" effect results in general terms in the fact that the crew-evacuation vehicle 34, in ballistic flight, spontaneously orients itself with its nose 38 towards the front, and thus spontaneously moves in its nominal movement direction D2.

Generating such an aerodynamic effect makes it possible in particular to avoid as far as possible the crew-evacuation vehicle, which is not designed to generate lift in flight, suffering uncontrolled parasitic movements such as rotation movements about its axis 42, which could be prejudicial to the survival of the crew.

The stabilising fins 60 are preferably regularly distributed around the axis 42 and are for example four in number. Configurations with only three—or more than four—of these stabilising fins 60 are also possible.

With reference to FIGS. 6-9, the stabilising fins 60 have respective free first ends 62, and respective second ends 64 by means of which the stabilising fins 60 are mounted pivotably on the fuselage 36 on respective pivot axes 61, so as to be movable between their retracted and deployed positions. In the retracted position, the second ends 64 are located at the rear with respect to the first ends 62. In addition, respective first edges 66 of the stabilising fins 60 extend along the external surface of the fuselage 36, and respective second edges 68 of the fins, opposite to the first edges 66, are further away from the external surface of the fuselage 36 than the first edges 66 are. In the deployed position, the respective first ends 62 of the fins are further away from the external surface of the fuselage 36 than they are in the retracted position and are located at the rear with respect to the second ends 64. For this purpose, the pivot axes 61 are advantageously orthoradial with respect to the axis 42 of the crew-evacuation vehicle 34.

The configuration of stabilising fins 60 proposed is particularly remarkable because it makes it possible to obtain the "shuttlecock" effect in a very wide range of flight velocities, ranging from the subsonic domain to the hypersonic domain, and thus covering the range of velocities encountered during a space mission with atmosphere re-entry.

The deployment of the stabilising fins 60 is designed to take place as soon as the crew-discharge vehicle 34 is extracted out of its housing 32. For this purpose, each of the stabilising fins 60 is for example acted on by an elastic means such as a torsion spring 69 (illustrated highly schematically on FIG. 6) acting about the pivot axis 61 of the fin so as to permanently urge the fin 60 towards its deployed position. Retention means, an example of which will be described hereinafter, make it possible to hold the stabilising fins 60 in their retracted position as long as the crew-evacuation vehicle 34 is located in the housing 32.

In the preferential example illustrated, the stabilisation devices 59, in particular the respective second edges 68 of the stabilising fins 60, project with respect to the fuselage 36 in the retracted position.

Figure 2A:
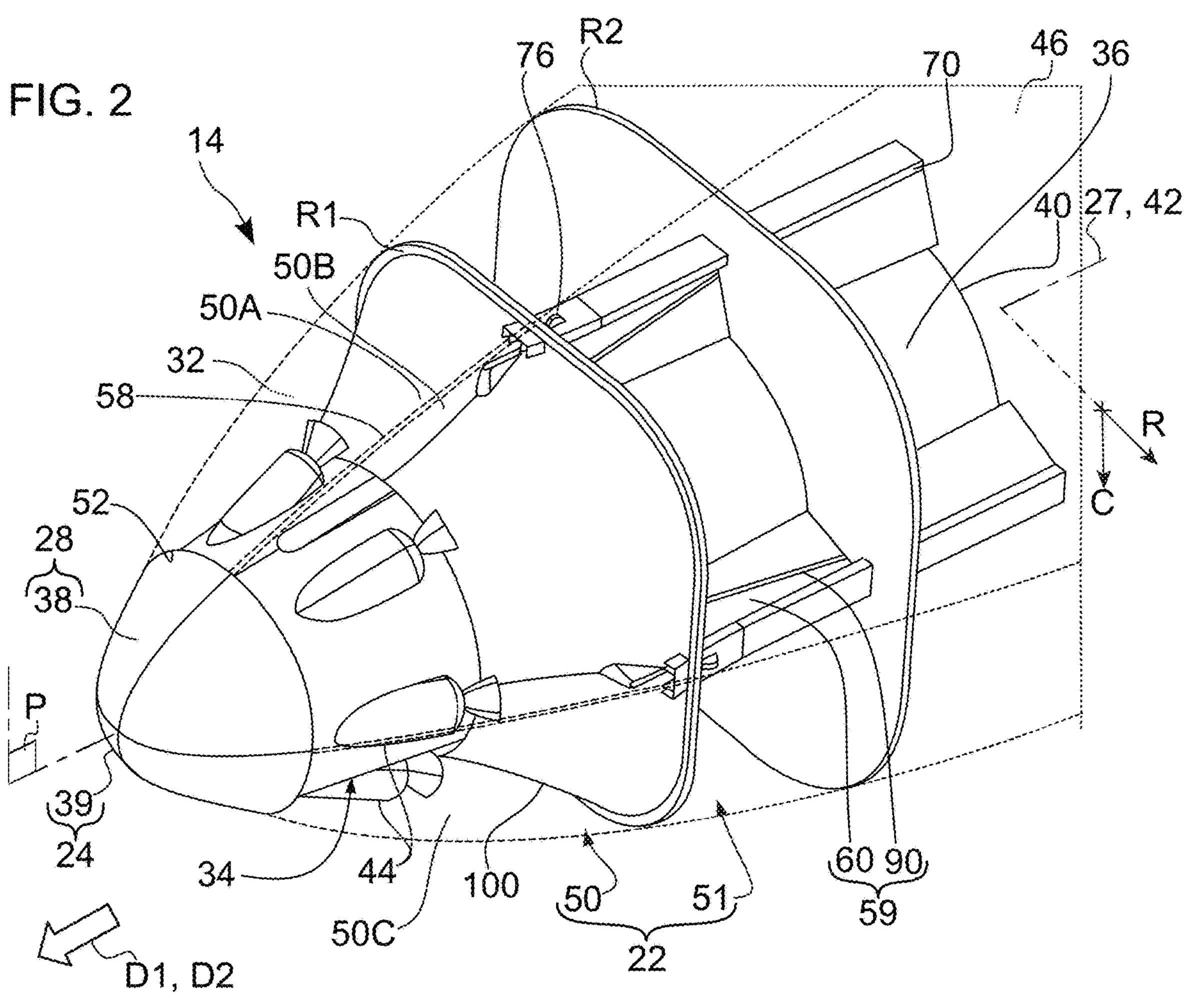
FIG. 2A is a view to a larger scale of a part of FIG. 2.
Figure 2A:
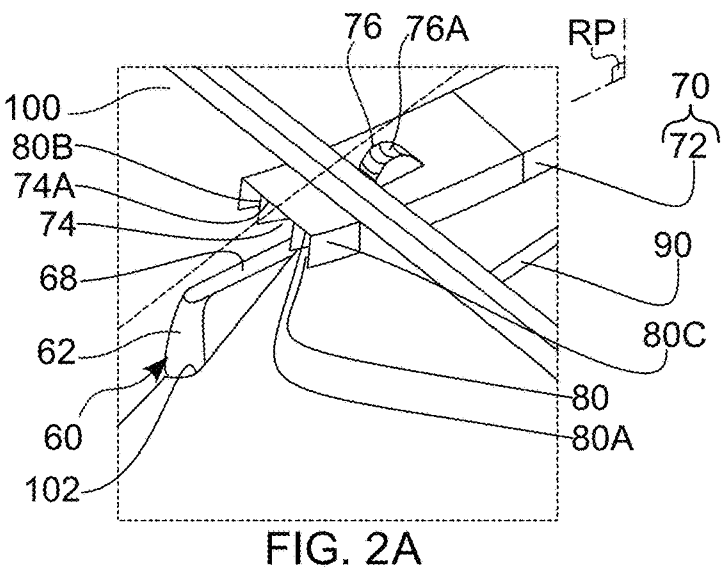

This particularity is advantageously taken advantage of to guide the crew-evacuation vehicle 34 during extraction thereof out of the reusable orbital vehicle 14, by means of guide structures 70 secured to the fuselage 36 and projecting in the housing 32 (FIGS. 4, 4A and 5) so as to constitute lateral stops with respect to the stabilisation devices 59 of the crew-evacuation vehicle (FIGS. 2, 2A and 3). "Lateral stop" must be understood to mean a structure forming an obstacle to a movement of the stabilisation device 59 in a direction orthogonal to the midplane of the stabilisation device, i.e. in the orthoradial direction C, such as a movement resulting from a rotation of the crew-evacuation vehicle 34 about its axis 42, as will appear more clearly hereinafter.

In the preferential example illustrated, the guide structures 70 comprise respectively rails 72 respectively centred on planes RP passing through the axis 42 and each comprising a groove, called a main groove 74 hereinafter, which is for example centred on the corresponding plane RP passing through the axis 42.

The guide structures 70 are preferably configured to furthermore exert a radial abutment inwards on the second edges 68 of the stabilising fins 60 of the crew-evacuation vehicle 34 so as to contribute in whole or in part to the centring of the crew-evacuation vehicle 34 in the housing 32 and to the holding of the stabilising fins 60 in their retracted position.

In order to make the movement of the crew-evacuation vehicle 34 fluid during extraction thereof, the contact between the guide structures 70 and the stabilisation devices 59 is advantageously exerted by means of rollers.

In the preferential example illustrated, the guide structures 70 thus comprise respective first rollers 76 carried by the rails 72, preferably in proximity to front ends of the rails 72. These first rollers 76 each project with respect to a bottom 74A of the corresponding main groove 74 (said bottom being visible on FIGS. 2A and 4A), and each comprise for example a notch 76A (see FIGS. 2A and 4A) in which the second edge 68 of a corresponding stabilising fin 60 is engaged, so that the flanks of the notch 76A constitute lateral stops with respect to the stabilising fin 60 in accordance with the definition given above, while a bottom of the central notch 76A exerts the aforementioned radial abutment on the second edge 68 of the fin, as explained above, during the process of extracting the crew-evacuation vehicle. In a variant, the first roller 76 described above can be replaced by two rollers between which the second edge 68 of a corresponding stabilising fin 60 is sandwiched. Such an arrangement advantageously uses a wedge effect between the aforementioned first rollers and the flanks of the fin 60, using the radially outward urging of the fin 60 by the aforementioned elastic means and the slightly splayed character of the fin 60 radially inwards from the second edge 68.

In addition, the stabilisation devices 59 comprise second rollers 78 (FIGS. 6 and 7) located at the rear with respect to the first roller 76 when the crew-evacuation vehicle 34 is installed in the housing 32. These second rollers 78 are arranged to engage in lateral grooves 80 formed by the rails 72 and adjacent to the main grooves 74 (FIGS. 2A and 4A). Each lateral groove 80 is defined by a bottom 80A and by two lateral ribs 80B, 80C.

For example, with each stabilising fin 60 there are associated two second rollers 78 disposed on each side of the fin, for example in proximity to rear ends of the latter, and engaged respectively in the two lateral grooves 80 of the corresponding rail 72.

The lateral ribs 80B, 80C of the lateral grooves 80 thus constitute lateral stops with respect to the stabilising fin 60 in accordance with the definition given above, while the respective bottoms 80A of the lateral grooves 80 form running tracks for the second rollers 78 and thus contribute to the centring of the crew-evacuation vehicle 34 in the housing 32.

When the crew-evacuation vehicle 34 is extracted, the second rollers 78 follow the forward movement of the crew-evacuation vehicle by running against the respective bottoms 80A of the lateral grooves 80, and finally leave the lateral grooves 80 through front ends thereof. Such an arrangement thus makes it possible to avoid any interference between the first rollers 76, fixed with respect to the reusable orbital vehicle 14 and disposed in the central groove 74 of each rail 72, and the second rollers 78 carried by the crew-evacuation vehicle 34 and offset laterally with respect to the first rollers 76 while being for example disposed in the lateral grooves 80 of each rail 72.

In the preferential example illustrated, the stabilisation devices 59 comprise respectively fixed structures 90, extending for example longitudinally and projecting radially with respect to the fuselage 36 of this vehicle. These fixed structures 90 define grooves 92 (FIGS. 8 and 9) in which the respective first edges 66 of the stabilising fins 60 are housed in the retracted position. These fixed structures 90 are furthermore advantageously profiled so as to contribute to the aerodynamic stabilisation of the crew-evacuation vehicle 34 in combination with the stabilising fins 60 in the deployed position. In addition, the fixed structures 90 stiffen the fuselage 36, which is particularly advantageous having regard to the high mechanical stresses that the fuselage must withstand during a manoeuvre of extracting the crew-evacuation vehicle. Finally, the fixed structures 90 advantageously have a tapered shape towards the front of the crew-evacuation vehicle 34, for example in the radial and circumferential directions, so as to contribute to the satisfaction of the area rule by the crew-evacuation vehicle.

In the example illustrated, the second rollers 78 are carried by the fixed structures 90.

According to another aspect of the present disclosure, the reusable orbital vehicle 14 comprises a baffle skirt 100 with a roughly annular shape splayed in the rearward direction, for example substantially frustoconical, extending in the housing 32 so as to surround the fuselage 36 of the crew-evacuation vehicle 34 when the latter is housed therein, while being disposed at the rear with respect to the propulsion means 44 attached to the fuselage 36 of the crew-evacuation vehicle, and axially facing said propulsion means 44. For this purpose, the propulsion means 44, which consist for example of a plurality of rocket engines, are arranged in a front part of the fuselage 36, preferably at the rear of and in proximity to the base of the nose 38.

The baffle skirt 100 thus diverts the jets of gas produced by the propulsion means 44 at the start of a manoeuvre of extracting the crew-evacuation vehicle and thus protects the reusable orbital vehicle 14 by guaranteeing its mechanical and structural integrity. During such a manoeuvre, the form of the crew-evacuation vehicle 34 roughly splayed towards the rear means that a rear part of the vehicle comes into collision at least with a radially internal part of the baffle skirt 100 and causes a fragmentation thereof. The baffle skirt 100 is therefore designed to facilitate such fragmentation, for example by means of preferred rupture zones defined at the junctions between panels constituting the skirt, in a similar manner to what is described above with regard to the fairing 50.

In the example illustrated, the baffle skirt 100 has a rear end connected to the front fuselage frame R1. The front fuselage frame R1 thus in particular absorbs the forces caused by the deflection of the gas jets produced by the propulsion means 44.

In the example illustrated, the stabilising fins 60 extend forwards beyond the baffle skirt 100. The latter is thus provided with openings 102 of elongate shape in the radial direction R, through which front end parts of the fins 60 extend (FIGS. 2A and 4A).

In a variant, the propulsion means 44 can be arranged in a rear part of the crew-evacuation vehicle 34 without departing from the general scope of the present disclosure.

In the light of the above, it must therefore be understood that a method for evacuating the crew of a reusable orbital vehicle 14 of the type described above comprises, in general terms, steps consisting in:

A) installing the crew of the reusable orbital vehicle 14 in the crew-evacuation vehicle 34; this step A may correspond to the initial installation of the crew in the reusable orbital vehicle 14 before takeoff, in particular in the case where evacuation takes place at takeoff or in ascent phase; in the case where the evacuation takes place in a subsequent phase of a space mission, the step A can in particular consist, for the crew, in regaining the crew-evacuation vehicle 34 after having spent time in another part of the reusable orbital vehicle 14 such as the working space 46;

B) evacuating the crew by moving the crew-evacuation vehicle 34 in said direction D1 so as to extract it out of the housing; the step B can be performed during any one of the takeoff, ascent, end of atmosphere re-entry, final approach, landing and post-landing phases of a space mission.

Where applicable, as explained above, the crew-evacuation vehicle 34 takes with it the nose 28 of the reusable orbital vehicle during the step B.

Where applicable, as explained above, the crew-evacuation vehicle 34 causes the rupture of said frangible connections 58 during the step B.

Where applicable, as explained above, the crew-evacuation vehicle 34 causes the rupture of said baffle skirt 100 during the step B.

Where applicable, as explained above, the stabilising fins 60 move during the step B, from said retracted position into said deployed position.

Where applicable, as explained above, the crew-evacuation vehicle 34 is prevented from turning about its axis 42 by said guide structures 70 during the step B.

The invention claimed is:

1. A reusable orbital vehicle for a space transport system, comprising a fuselage with a shape splayed in a direction going from a front end of the reusable orbital vehicle to a rear end of said fuselage and within which a housing is defined extending to a front end of the fuselage, and a crew-evacuation vehicle housed in said housing while being oriented so as to be extracted from the housing in a direction oriented from said rear end of the fuselage towards said front end of the reusable orbital vehicle, wherein:

said fuselage comprises a fairing that surrounds the housing and extends so as to be splayed in the direction of the rear end of this fuselage from the front end of the fuselage, which is truncated so as to define an opening emerging in the housing; and the crew-evacuation vehicle comprises a fuselage that has a nose extending through the opening so as to constitute a nose of the reusable orbital vehicle.

2. The reusable orbital vehicle according to claim 1, wherein said nose extends in aerodynamic continuity with the fairing.

3. The reusable orbital vehicle according to claim 1, wherein the fuselage of the crew-evacuation vehicle has a step formed at the base of said nose, and wherein the front end of the fairing is arranged axially facing said step.

4. The reusable orbital vehicle according to claim 1, wherein the fairing is formed by an annular row of panels joined in pairs by frangible connections constituting preferred rupture zones.

5. The reusable orbital vehicle according to claim 1, wherein the crew-evacuation vehicle comprises propulsion means configured to generate a thrust in said direction, wherein the reusable orbital vehicle comprises a baffle skirt with a roughly frustoconical shape, extending within the housing so as to surround the crew-evacuation vehicle and to be disposed at the rear and axially facing with respect to propulsion means of the crew-evacuation vehicle.

6. A method for evacuating a crew of a reusable orbital vehicle according to claim 1, comprising A) installing the crew of the reusable orbital vehicle in the crew-evacuation vehicle; then B) evacuating the crew by moving the crew-evacuation vehicle in said direction so as to extract it out of the housing, wherein:

the crew-evacuation vehicle takes with it the nose of the reusable orbital vehicle during the step B.

7. The method according to claim 6, wherein:

the fairing is formed by an annular row of panels joined in pairs by frangible connections constituting preferred rupture zones, and wherein the crew-evacuation vehicle causes the rupture of said frangible connections during the step B.

8. The method according to claim 6, further comprising a baffle skirt with a roughly frustoconical shape, extending within the housing so as to surround the crew-evacuation vehicle and to be disposed at the rear and axially facing with respect to propulsion means of the crew-evacuation vehicle configured to generate a thrust in said direction, and wherein the crew-evacuation vehicle causes the rupture of said baffle skirt during the step B.

9. The method according to claim 6, wherein the step B is performed during any one of the takeoff, ascent, end of atmosphere re-entry, final approach, landing and post-landing phases.

* * * * *